3,129,200
POLYURETHANE PREPOLYMERS CURED WITH BUTENE OR BUTYNE DIOL
Erwin Müller, Leverkusen, Hans Holtschmidt, Cologne-Stammheim, and Konrad Ellegast, Leichlingen, Germany, assignors to Farbenfabriken Bayer Aktiengesellschaft, Leverkusen, Germany, a corporation of Germany
No Drawing. Filed Aug. 10, 1959, Ser. No. 832,483
Claims priority, application Germany Aug. 14, 1958
3 Claims. (Cl. 260—75)

This invention relates to polyurethane castings and to a process for casting polyurethane plastics. More particularly this invention relates to an improved process for casting substantially non-porous polyurethane plastics and improved substantially non-porous polyurethane castings obtained thereby.

Substantially non-porous polyurethane plastics have heretofore been prepared by a casting process wherein an organic diisocyanate is reacted with an hydroxyl compound in a first step to prepare an organic diisocyanate-modified compound having terminal —NCO groups which is thereafter mixed with an alkylene glycol, diamine or similar cross-linking agent in a second step and cast in a mold where it is allowed to cure to form a substantially non-porous polyurethane plastic. Such a process is disclosed in German Patent 831,772 wherein a polyhydroxyl compound is first reacted with an excess of organic diisocyanate to prepare an isocyanate-modified product having terminal —NCO groups which is thereafter mixed with an alkylene glycol in a quantity insufficient for reaction with all the free isocyanate groups and cast in a mold.

The properties of polyurethane castings depend largely on the proportions of the components used and particularly the amount of organic polyisocyanate. Polyurethane castings prepared from an excess of 200% to 250% organic diisocyanate based on the amount necessary to react with all the polyhydroxyl compound have a higher tensile modulus and degree of hardness than those prepared from a 70% to 100% excess of organic diisocyanate. However, it has not been possible heretofore to prepare polyurethane castings from excesses of organic polyisocyanate above about 250% because of the short casting times resulting from using these amounts. Even when employing a 200% excess of organic polyisocyanate, the casting time is a maximum of only about one minute. Casting time as used herein refers to the length of time between incorporation of the cross-linking agent and the time at which the mixture can no longer be poured into the mold.

It has also been proposed heretofore to cure organic diisocyanate-modified polyesters obtained from an excess of up to about 250% organic diisocyanate with unsaturated glycols such as butine glycol. While the unsaturated glycols employed organic diisocyanate in these proportions gave longer casting times, the resulting products had inferior mechanical values and could not be removed from the mold for about one hour due to an increase in the time necessary for the casting to harden.

It is an object of this invention to provide improved polyurethane castings. Another object of this invention is to provide an improved casting process for polyurethane plastics. Still another object of this invention is to provide a process for the preparation of polyurethane plastics by a casting technique. Another object of this invention is to provide polyurethane castings having improved tensile modulus. A further object of this invention is to provide polyurethane castings having improved hardness. Still a further object of this invention is to improve the casting time in the casting of polyurethane plastics.

The foregoing objects and others which will become apparent from the following description are accomplished in accordance with the invention, generally speaking, by providing polyurethane castings obtained by reacting an organic polyisocyanate with an organic compound containing at least two active hydrogen containing groups which are reactive with an —NCO group to form a polyurethane plastic in a first step in an amount of about 300 to about 700 percent excess of organic polyisocyanate over that necessary to react with all of the active hydrogen atoms of said organic compound to prepare an organic polyisocyanate-modified organic compound having terminal —NCO groups and thereafter mixing said organic polyisocyanate-modified organic compound having terminal —NCO groups with an organic compound having two hydroxyl groups and containing some aliphatic unsaturation and casting the mixture in a mold. Thus, this invention contemplates a process for casting polyurethane plastics which involves preparing an organic diisocyanate-modified polyester having terminal —NCO groups from a large excess of from about 300 to about 700 percent isocyanate based on the active hydrogen atoms of the polyester and thereafter mixing said organic isocyanate-modified polyester with an unsaturated glycol to bring about crosslinking and pouring the resulting mixture into a mold.

In accordance with the casting process of the present invention, it is possible to use the large excesses of the organic polyisocyanate recited without the accompanying disadvantage of short casting times leading to an unsatisfactory rapid rate of reaction prior to molding of the liquid reaction mixture. The casting time varies from about one to about three minutes when the process of this invention is employed using an excess of 300 to 700 percent organic polyisocyanate based on the active hydrogen atoms of the organic compound having at least two active hydrogen atoms. In contrast to these casting times set forth above using over 300 percent excess organic polyisocyanate, a maximum casting time of one minute exists where 200 percent excess organic polyisocyanate is employed and saturated glycols are used as cross-linkers. Moreover, the unsaturated polyhydroxyl compounds employed as cross-linkers in accordance with this invention yield castings having inferior mechanical properties which may not be removed from the mold for about one hour unless at least about 300 percent excess polyisocyanate is employed.

Any suitable organic compound containing at least two hydroxyl groups and containing some aliphatic unsaturation may be used as the cross-linking agent in the process of the present invention. It is preferred that the compound containing aliphatic unsaturation have a molecular weight below about 500 and monomeric compounds containing aliphatic unsaturation are most preferred. Suitable compounds of this type include, for example, alkenes, alkines and aliphatic derivatives thereof containing two hydroxyl groups. Any suitable alkene containing two hydroxyl groups may be used, such as, for example, 1,4-butene diol, 1,5-pentene diol and the like. Any suitable alkine may be used, such as, for example, 1,4-butine diol, 1,5-pentyne diol and the like. Any suitable alkyl substituted alkene and/or alkine may be used, such as, for example 3-hexene-2,5-diol, 3-hexine-2,5-diol, and the like.

Any suitable organic polyisocyanate may be used such as, for example, 1,5-naphthalene diisocyanate, p,p'-diphenylmethane diisocyanate, 2,4-tolylene diisocyanate, 2,6-tolylene diisocyanate and mixtures thereof, 1,6-hexamethylene diisocyanate, p-phenylene diisocyanate and the like.

Any suitable organic compound containing at least two active hydrogen containing groups which are reactive with an isocyanate group to form a polyurethane plastic may be used such as, for example, hydroxyl polyesters, polyhydric polyalkylene ethers, polyhydric polythioethers, polyacetals, polyester amides and polymerization products of unsaturated compounds containing hydroxyl groups and the like.

Any suitable hydroxyl polyester may be used such as, for example, hydroxyl polyesters obtained from the condensation of a polycarboxylic acid and a polyhydric alcohol. Any suitable carboxylic acid may be used, such as, for example, adipic acid, sebacic acid, fumaric acid, maleic acid, oxalic acid, phthalic acid, terephthalic acid and the like. Any suitable polyhydric alcohol may be used such as, for example, ethylene glycol, butylene glycol, amylene glycol, 1,6-hexanetriol, trimethylol propane, glycerine, pentaerythritol and the like.

Any suitable polyhydric polyalkylene ether may be used such as, for example, the condensation product of an alkylene oxide with a small amount of an active hydrogen containing compound such as water, ethylene glycol, propylene glycol, butylene glycol, amylene glycol, trimethylol propane, glycerine, pentaerythritol and the like. Any suitable alkylene oxide may be used such as, for example, ethylene oxide, propylene oxide, butylene oxide, amylene oxide and the like. One particularly suitable example is tetrahydrofuran. The polyhydric polyalkylene ethers preferably have from 2 to 4 hydroxyl groups and may be prepared by any known process such as, for example, the process described by Wurtz in 1859 and in "Encyclopedia of Chemical Technology," volume 7, pages 257 to 262, published by Interscience Publishers, Inc., 1951, or in U.S. Patent 1,922,459.

Any suitable polyhydric polythioether may be used, such as, for example, the reaction product of one of the aforementioned alkylene oxides used in the preparation of the polyhydric polyalkylene ethers with a polyhydric thioether, such as, for example, thiodiglycol, 3,3'-dihydroxy propyl sulfide, 4,4'-dihydroxy butyl sulfide and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any suitable polyhydric alcohol may be used such as, for example, ethylene glycol, propylene glycol, butylene glycol, trimethylol propane, pentaerythritol and the like.

Any suitable polyester amide may be used such as, for example, the reaction product of an amine and/or amino alcohol with a polycarboxylic acid. Any suitable amine, such as, for example, ethylene diamine, propylene diamine, and the like may be used. Any suitable amino alcohol, such as, for example, 1-hydroxy, 2-amino ethylene and the like may be used. Any suitable polycarboxylic acid may be used, such as, for example, those more particularly disclosed above for the preparation of the hydroxyl polyesters.

Any suitable polymerization product of an unsaturated compound and containing hydroxyl groups may be used, such as, for example, polyvinyl alcohol as well as linear polymerization products of butadiene, isoprene and the like containing hydroxyl groups.

While any suitable organic compound containing at least two active hydrogen containing groups which are reactive with an isocyanate group to form a polyurethane plastic may be used, it is preferred to employ organic compounds of this type which have a molecular weight above about 800 and most preferably within the range of from about 1000 to about 5000. When the hydroxyl polyesters are employed, they should preferably have an acid number not greater than about two and most preferably less than about 1. Where polyhydric polyalkylene ethers are employed, it is preferred that they have an hydroxyl number within the range of from about 25 to about 200 and most preferably within the range of from about 40 to about 70.

The casting process of the present invention makes it possible to prepare polyurethane castings in a more convenient manner with increased casting times and relatively short molding times. The reaction of the organic compound containing at least two active hydrogen containing groups which are reactive with an isocyanate to form a polyurethane plastic is preferably carried out under substantially anhydrous conditions at about room temperature or above and most preferably at temperatures within the range of from about 80° to about 150° C. The unsaturated cross-linker is thereafter preferably added in such a proportion that the existing excess of —NCO groups is still present after the addition. The mixture of the organic polyisocyanate-modified organic compound containing at least two active hydrogen containing groups and the unsaturated cross-linker are then quickly and thoroughly mixed by any suitable stirring method and introduced into a mold while still in a pourable liquid condition. The mass is then allowed to harden in the mold to form an elastomeric plastic, preferably at a temperature of about 100° C. to 125° C. and most preferably at about 110° C. The molded elements may be removed from the mold in a short time, usually not more than about 30 minutes, and are preferably subsequently heated in a free atmosphere at temperatures within the range of about 100° C. to 125° C. and most preferably at about 110° C. for from about 12 to about 24 hours.

The castings obtained by the process of the present invention have improved tensile modulus and Shore hardness which makes them especially useful for the production of gears, elastic couplings and the like.

The invention is further illustrated by the following illustrative embodiments.

*Example 1*

About 400 parts by weight of a glycol-adipic acid polyester (OH number 56) are dehydrated at about 130° C./12 mm. About 280 parts by weight of 1,5-naphthylene diisocyanate (about 570% excess) are then incorporated by stirring at this temperature. The temperature is kept for about 25 minutes at about 130–140° C. and then about 96 parts by weight of butene-1,4-diol are incorporated by stirring at about 130° C. The homogeneous melt is then poured into molds which had been heated beforehand to about 120° C. and the melt is then heated for approximately another 24 hours at about 100° C. The casting time is about 1½ minutes. An elastic material having the following properties is obtained:

| | |
|---|---|
| Tensile strength kg./cm.$^2$ | 403 |
| Breaking elongation percent | 345 |
| Stress value at 20% elongation kg./cm.$^2$ | 164 |
| Stress value at 300% elongation kg./cm.$^2$ | 342 |
| Permanent elongation percent | 54 |
| Resistance to further tearing kg./cm.$^2$ | 71 |
| Shore hardness degrees | 96 |
| Elasticity percent | 28 |

*Example 2*

About 400 parts by weight of a glycol-adipic acid polyester (OH number 56) are dehydrated at about 130° C./12 mm. About 240 parts by weight of 1,5-naphthylene diisocyanate (about 475% excess) are then incorporated by stirring at this temperature. The temperature is kept for about 15 minutes at about 130–140° C. and then about 78.4 parts by weight of butene-1,4-diol are incorporated by stirring. The casting time is about 2 minutes. The material obtained has the following properties:

| | |
|---|---|
| Tensile strength kg./cm.$^2$ | 305 |
| Breaking elongation percent | 350 |
| Stress value at 20% kg./cm.$^2$ | 143 |
| Stress value at 300% kg./cm.$^2$ | 264 |
| Permanent elongation percent | 57 |
| Shore hardness degrees | 96 |
| Elasticity percent | 34 |

Example 3

After about 200 parts by weight of a tetrahydrofuran polymer (OH number 43) have been dehydrated at about 130° C./12 mm. About 100 parts by weight of 1,5-naphthylene diisocyanate (about 385% excess) are incorporated by stirring. The temperature is kept for about 30 minutes at about 130–140° C. and then about 33.2 parts by weight of butene-1,4-diol are incorporated by stirring. The liquid reaction mixture is poured into molds which have been heated beforehand to about 120° C. and finally heated for about 24 hours at about 100° C. The casting time is about 1½ minutes. The material has the following properties:

| | |
|---|---|
| Tensile strength _____kg./cm.$^2$__ | 243 |
| Breaking elongation _____percent__ | 375 |
| Stress value at 20% elongation _____kg./cm.$^2$__ | 28 |
| Stress value at 300% elongation _____kg./cm.$^2$__ | 193 |
| Permanent elongation _____percent__ | 40 |
| Shore hardness _____degrees__ | 94 |
| Elasticity _____percent__ | 56 |

Example 4

After about 400 parts by weight of a glycol-adipic acid polyester (OH number 56) have been dehydrated at about 130° C./12 mm. About 240 parts by weight of 1,5-naphthylene diisocyanate (about 475% excess) are incorporated by stirring. The procedure followed is in accordance with that indicated in Example 1 and about 76.8 parts by weight of butine-1,4-diol are incorporated into the melt by stirring, which is then poured into molds, and after the final heating, there is obtained an elastomeric material with the following properties:

| | |
|---|---|
| Tensile strength _____kg./cm.$^2$__ | 293 |
| Breaking elongation _____percent__ | 240 |
| Stress value at 20% elongation _____kg./cm.$^2$__ | 180 |
| Permanent elongation _____percent__ | 44 |
| Shore hardness _____degrees__ | 96 |
| Elasticity _____percent__ | 30 |

Example 5

To about 700 parts by weight of a polythioether (OH number 53) prepared from thiodiglycol and triethylene glycol are added 350 parts by weight (about 375% excess) of 1,5-naphthylene diisocyanate at 150° C. The mixture is held while stirring for about 10 minutes in vacuo until a clear melt results. About 112 parts by weight of butene-1,4-diol are incorporated by stirring. The liquid reaction mixture is poured into molds which have been heated to about 110° C. and finally heated for about 24 hours at 110° C. The material has the following properties:

| | |
|---|---|
| Tensile strength _____kg./cm.$^2$__ | 200 |
| Breaking elongation _____percent__ | 270 |
| Permanent elongation _____do____ | 23 |
| Stress value at 20% elongation _____kg./cm.$^2$__ | 133 |
| Shore hardness _____degrees__ | 95 |
| Elasticity _____percent__ | 42 |

Example 6

To 100 parts by weight of a polythioether (OH number 53) prepared from thiodiglycol and triethylene glycol are added at 120° C. 50 parts by weight (400% excess) of 4,4'-diphenylmethane diisocyanate. The mixture is held for 15 minutes under vacuum until a clear melt results. Then 12.6 parts by weight of butene-1,4-diol are incorporated by stirring. The liquid mixture is poured into molds which have been heated beforehand to about 120° C. and finally heated for about 24 hours at 100° C. The casting time is about 1.5 minutes. The material has the following properties:

| | |
|---|---|
| Tensile strength _____kg./cm.$^2$__ | 125 |
| Breaking elongation _____percent__ | 300 |
| Permanent elongation _____do____ | 10 |
| Stress value at 20% elongation _____kg./cm.$^2$__ | 30 |
| Stress value at 300% elongation _____kg./cm.$^2$__ | 125 |
| Shore hardness _____degrees__ | 82 |
| Elasticity _____percent__ | 48 |

Although only some of the above-described unsaturated cross-linkers, organic polyisocyanates and organic compounds containing at least two active hydrogen containing groups which are reactive with an isocyanate group to form a polyurethane plastic were employed in the foregoing illustrative embodiments, it is to be understood that any other suitable components could have been used with equally satisfactory results as more particularly set out above.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for the preparation of a polyurethane which comprises:
    (a) reacting an organic polyisocyanate selected from the group consisting of 4,4'-diphenyl methane diisocyanate and 1,5-naphthylene diisocyanate with an organic compound having a molecular weight of at least about 800 and having at least two reactive hydrogen atoms which are reactive with —NCO groups to form a polyurethane, obtaining thereby a polyurethane-prepolymer composition, said organic polyisocyanate being present in an amount of from about 300% to about 700% excess —NCO groups over that amount required to react one —NCO group with each active hydrogen atom of said organic compound, said organic compound being selected from the group consisting of polyesters, poly(alkylene ether)glycols and poly(alkylene ether thioether) glycols; and
    (b) mixing and reacting the resulting polyurethane-prepolymer composition with a glycol selected from the group consisting of butene diol and butyne diol, said glycol being present in an amount less than that required to reduce the —NCO content of said prepolymer composition to zero.

2. The process of claim 1 wherein said organic polyisocyanate is 1,5-naphthylene diisocyanate.

3. The process of claim 1 wherein said organic compound having at least two reactive hydrogen atoms is an hydroxyl-terminated polymer obtained from ethylene glycol and adipic acid.

References Cited in the file of this patent

UNITED STATES PATENTS

| | | |
|---|---|---|
| 2,729,618 | Muller et al. _____ | Jan. 3, 1956 |
| 2,854,486 | McShane _____ | Sept. 30, 1958 |
| 2,894,919 | Simon _____ | July 14, 1959 |
| 2,929,794 | Simon et al. _____ | Mar. 22, 1960 |
| 2,981,719 | Muhlhausen _____ | Apr. 25, 1961 |

FOREIGN PATENTS

| | | |
|---|---|---|
| 796,041 | Great Britain _____ | June 4, 1958 |
| 804,067 | Great Britain _____ | Nov. 5, 1958 |

UNITED STATES PATENT OFFICE
CERTIFICATE OF CORRECTION

Patent No. 3,129,200　　　　　　　　　　　April 14, 1964

Erwin Müller et al.

It is hereby certified that error appears in the above numbered patent requiring correction and that the said Letters Patent should read as corrected below.

Column 2, line 67, for "idisocyanate" read -- diisocyanate --; column 6, line 56, for "polymer" read -- polyester --.

Signed and sealed this 18th day of August 1964.

(SEAL)
Attest:

ERNEST W. SWIDER
Attesting Officer

EDWARD J. BRENNER
Commissioner of Patents